US007276865B2

(12) United States Patent
Ochiai

(10) Patent No.: US 7,276,865 B2
(45) Date of Patent: Oct. 2, 2007

(54) POWER OUTPUT APPARATUS, MOTOR DRIVING METHOD AND COMPUTER-READABLE RECORDING MEDIUM HAVING PROGRAM RECORDED THEREON FOR ALLOWING COMPUTER TO EXECUTE MOTOR DRIVE CONTROL

(75) Inventor: Kiyoe Ochiai, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 143 days.

(21) Appl. No.: 10/751,734

(22) Filed: Jan. 6, 2004

(65) Prior Publication Data
US 2004/0150365 A1 Aug. 5, 2004

(30) Foreign Application Priority Data
Jan. 30, 2003 (JP) ............................. 2003-021512

(51) Int. Cl.
*H02P 1/54* (2006.01)
(52) U.S. Cl. ........................... 318/34; 318/112; 318/41
(58) Field of Classification Search ................ 318/106, 318/107, 44, 41, 146, 1, 39, 801, 85, 34, 318/112
See application file for complete search history.

(56) References Cited

U.S. PATENT DOCUMENTS

| 4,641,066 | A | * | 2/1987 | Nagata et al. ............... 318/254 |
| 5,099,186 | A | * | 3/1992 | Rippel et al. ................ 318/803 |
| 5,936,312 | A | * | 8/1999 | Koide et al. ............... 290/40 R |
| 5,973,460 | A | * | 10/1999 | Taga et al. ................... 318/139 |
| 6,278,195 | B1 | | 8/2001 | Yamaguchi et al. |
| 6,295,487 | B1 | * | 9/2001 | Ono et al. ..................... 701/22 |
| 6,518,736 | B2 | * | 2/2003 | Sasaki et al. ................. 322/16 |
| 6,630,804 | B2 | * | 10/2003 | Moriya et al. ................. 318/85 |
| 2001/0015630 | A1 | * | 8/2001 | Shibazaki et al. ............ 318/34 |
| 2002/0105300 | A1 | * | 8/2002 | Moriya et al. .............. 318/727 |
| 2002/0167286 | A1 | * | 11/2002 | Fowler et al. ................. 318/34 |

FOREIGN PATENT DOCUMENTS

| JP | 08-289406 | 11/1996 |
| JP | 10-225181 | 8/1998 |
| JP | 10-268946 | 10/1998 |
| JP | 10-337047 | 12/1998 |
| JP | 11-178114 | 7/1999 |

(Continued)

OTHER PUBLICATIONS

U.S. Appl. No. 10/791,898, filed Mar. 4, 2004, Ochiai et al.

*Primary Examiner*—Karen Masih
(74) *Attorney, Agent, or Firm*—Oliff & Berridge, PLC

(57) ABSTRACT

A power output apparatus includes two motor generators, a DC power supply, a relay, three inverters and a control CPU. One of the motor generators includes three-phase coils. The DC power supply is connected via the relay between respective neutral points of the three-phase coils. When the sum of respective powers of the motor generators is zero, the control CPU generates a signal SE at L level for rendering the relay OFF to output the generated signal to the relay, and generates signals PWMC1, PWMC2 and PWMI3 for driving the other motor generator by electric power generated by the one motor generator to output the generated signals to the inverters respectively.

12 Claims, 10 Drawing Sheets

FOREIGN PATENT DOCUMENTS

| | | |
|---|---|---|
| JP | 2000-004600 | 1/2000 |
| JP | 2000-264048 | 9/2000 |
| JP | B2 3216589 | 8/2001 |
| JP | 2002-027761 | 1/2002 |
| JP | A 2002-171606 | 6/2002 |
| JP | A 2002-218793 | 8/2002 |
| JP | 2003-153579 | 5/2003 |
| JP | 2003-309903 | 10/2003 |
| JP | 2004-120853 | 4/2004 |

* cited by examiner

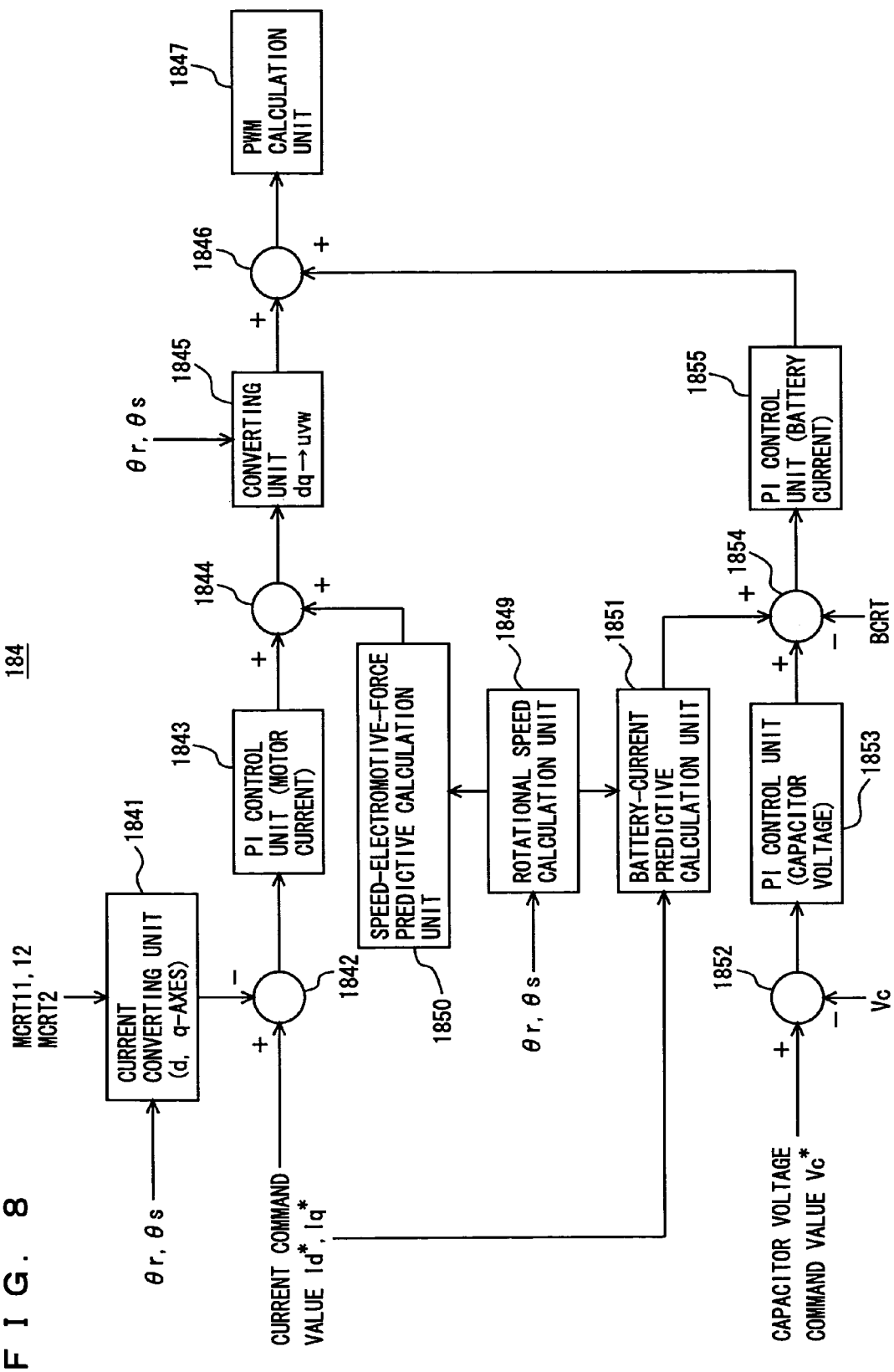

POWER OUTPUT APPARATUS, MOTOR DRIVING METHOD AND COMPUTER-READABLE RECORDING MEDIUM HAVING PROGRAM RECORDED THEREON FOR ALLOWING COMPUTER TO EXECUTE MOTOR DRIVE CONTROL

This nonprovisional application is based on Japanese Patent Application No. 2003-21512 filed with the Japan Patent Office on Jan. 30, 2003, the entire contents of which are hereby incorporated by reference.

BACKGROUND OF THE INVENTION

1. Field of the Invention

The present invention relates to a power output apparatus. In particular, the present invention relates to a power output apparatus using a double-winding motor, a motor driving method and a computer-readable recording medium having a program recorded thereon for allowing a computer to execute motor drive control.

2. Description of the Background Art

A conventional power output apparatus using a double-winding motor is known from Japanese Patent Laying-Open No. 2002-218793. Referring to FIG. 10, this conventional power output apparatus 300 includes a double-winding motor 310, a DC (direct current) power supply 320, inverters 330 and 340 and a capacitor 350.

Double-winding motor 310 includes two three-phase coils 311 and 312. DC power supply 320 is connected between respective neutral points of three-phase coils 311 and 312.

Inverter 330 includes three arms corresponding respectively to the U-phase coil, V-phase coil and W-phase coil of three-phase coil 311 and controls energization of three-phase coil 311. Inverter 340 also includes three arms corresponding respectively to the U-phase coil, V-phase coil and W-phase coil of three-phase coil 312 and controls energization of three-phase coil 312. Capacitor 350 and inverters 330 and 340 are connected in parallel between a positive-pole bus 301 and a negative-pole bus 302.

It is supposed here that a difference in potential between the neutral point of three-phase coil 311 and the neutral point of three-phase coil 312 is represented by V012 and a voltage of DC power supply 320 is represented by Vb. When there is a relation V012<Vb between the potential difference and the power-supply voltage, a DC current flows from DC power supply 320. The DC current flowing from DC power supply 320 is accumulated in one of the U-, V- and W-phase coils of three-phase coil 311 or 312 by switching control of corresponding one of the arms of inverter 330 or 340 so as to finally charge capacitor 350. In other words, one of the U-, V- and W-phase coils of three-phase coils 311 and 312 and corresponding one of the arms of inverters 330 and 340 constitute a voltage step-up converter to increase DC voltage Vb to an arbitrary level and thereby charge capacitor 350.

On the contrary, when there is a relation V012>Vb, a terminal-to-terminal voltage of capacitor 350 is decreased by one of the arms of inverters 330 and 340 and one of the U, V and W phase coils of three-phase coils 311 and 312 that corresponds to the above-mentioned arm so as to charge DC power supply 320.

With the terminal-to-terminal voltage of capacitor 350, inverters 330 and 340 control energization of three-phase coils 311 and 312 to drive double-winding motor 310. Depending on drive conditions of double-winding motor 310, a voltage to be applied to each phase coil of three-phase coils 311 and 312 varies and consequently, potential difference V012 between respective neutral points of three-phase coils 311 and 312 is larger or smaller than DC voltage Vb. Then, there arise the mode of charging capacitor 350 by DC power supply 320 and the mode of charging DC power supply 320 by capacitor 350 as described above.

In power output apparatus 300, DC voltage Vb of DC power supply 320 is increased to an arbitrary level by means of a part of the coils of double-winding motor 310 so as to charge capacitor 350. Then, by the terminal-to-terminal voltage of the charged capacitor 350, double-winding motor 310 is driven. Further, the terminal-to-terminal voltage of capacitor 350 is decreased to charge DC power supply 320.

Japanese Patent Laying-Open No. 2002-218793, however, does not disclose a power output apparatus applied to a hybrid vehicle of mechanical distribution type.

SUMMARY OF THE INVENTION

An object of the present invention is therefore to provide a power output apparatus suitable for hybrid vehicles of mechanical distribution type.

Another object of the present invention is to provide a motor driving method suitable for hybrid vehicles of mechanical distribution type.

Still another object of the present invention is to provide a computer-readable recording medium having a program recorded thereon for allowing a computer to execute motor drive control that is suitable for hybrid vehicles of mechanical distribution type.

According to the present invention, a power output apparatus includes a first inverter, a second inverter, a 2Y motor, a power supply and an electric motor. The 2Y motor has a first three-phase motor coil and a second three-phase motor coil that function as stators, and energization of the first and second three-phase motor coils is controlled respectively by the first and second inverters. The power supply is connected between a first neutral point of the first three-phase motor coil and a second neutral point of the second three-phase motor coil. The electric motor is different from the 2Y motor.

Preferably, the 2Y motor generates electric power from a rotational force from an internal combustion engine and starts the internal combustion engine.

Preferably, the power output apparatus further includes a planetary gear to which the 2Y motor, the electric motor and the internal combustion engine are connected.

Preferably, the power output apparatus further includes a third inverter and a control unit. The third inverter drives the electric motor and the control unit controls the first, second and third inverters. When the control unit controls the first and second inverters to allow the 2Y motor to function as an electric generator, the control unit controls the third inverter to allow the third inverter to drive the electric motor by electric power generated by the 2Y motor.

Preferably, the control unit disconnects the power supply from the first and second neutral points.

Preferably, the power output apparatus further includes a relay unit. The relay unit is provided between the first and second neutral points and the power supply. The relay unit is controlled by the control unit to connect/disconnect the power supply to/from the first and second neutral points.

According to the present invention, a motor driving method is a method of driving a 2Y motor coupled to an internal combustion engine of a hybrid vehicle and an electric motor coupled to drive wheels of the hybrid vehicle, and the method includes a first step of calculating a first power of the 2Y motor and a second power of the electric motor, a second step of determining whether the sum of the calculated first power and the calculated second power is zero or not, and a third step of disconnecting, when the sum is equal to zero, a power supply from respective neutral points of two three-phase coils included in the 2Y motor.

Preferably, the motor driving method further includes a fourth step of driving the 2Y motor as an electric generator, and a fifth step of driving the electric motor by electric power generated by the 2Y motor.

Preferably, the motor driving method further includes a sixth step of driving, when the sum is unequal to zero, the 2Y motor as an electric motor while increasing a voltage from the power supply to charge a capacitor provided on an input side of an inverter which drives the 2Y motor, and a seventh step of driving, when the sum is unequal to zero, the 2Y motor as an electric generator while decreasing a DC voltage from the capacitor to charge the power supply.

According to the present invention, a computer-readable recording medium has a program recorded thereon for allowing a computer to execute drive control of a 2Y motor coupled to an internal combustion engine of a hybrid vehicle and an electric motor coupled to drive wheels of the hybrid vehicle. The computer follows the program to execute a first step of calculating a first power of the 2Y motor and a second power of the electric motor, a second step of determining whether the sum of the calculated first power and the calculated second power is zero or not, and a third step of disconnecting, when the sum is equal to zero, a power supply from respective neutral points of two three-phase coils included in the 2Y motor.

Preferably, the computer follows the program to further execute a fourth step of driving the 2Y motor as an electric generator, and a fifth step of driving the electric motor by electric power generated by the 2Y motor.

Preferably, the computer follows the program to further execute a sixth step of driving, when the sum is unequal to zero, the 2Y motor as an electric motor while increasing a voltage from the power supply to charge a capacitor provided on an input side of inverters driving the 2Y motor, and a seventh step of driving, when the sum is unequal to zero, the 2Y motor as an electric generator while decreasing a DC voltage from the capacitor to charge the power supply.

According to the present invention, when the electric power generated by the 2Y motor is used to drive the electric motor, the power supply is disconnected from respective neutral points of the two three-phase coils included in the 2Y motor. Thus, the power generation efficiency of the 2Y motor can be improved and the electric motor can be operated over a wide range.

Further, the voltage-step-up operation for increasing the voltage of the power supply or the voltage-step-down operation for charging the power supply is carried out by the 2Y motor which does not drive the drive wheels of the hybrid vehicle. Thus, the electric motor which drives the drive wheels of the hybrid vehicle can exhibit a maximum efficiency.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a functional block diagram partially illustrating functions of a control CPU shown in FIG. 3.

DESCRIPTION OF THE PREFERRED EMBODIMENTS

Figure 1:
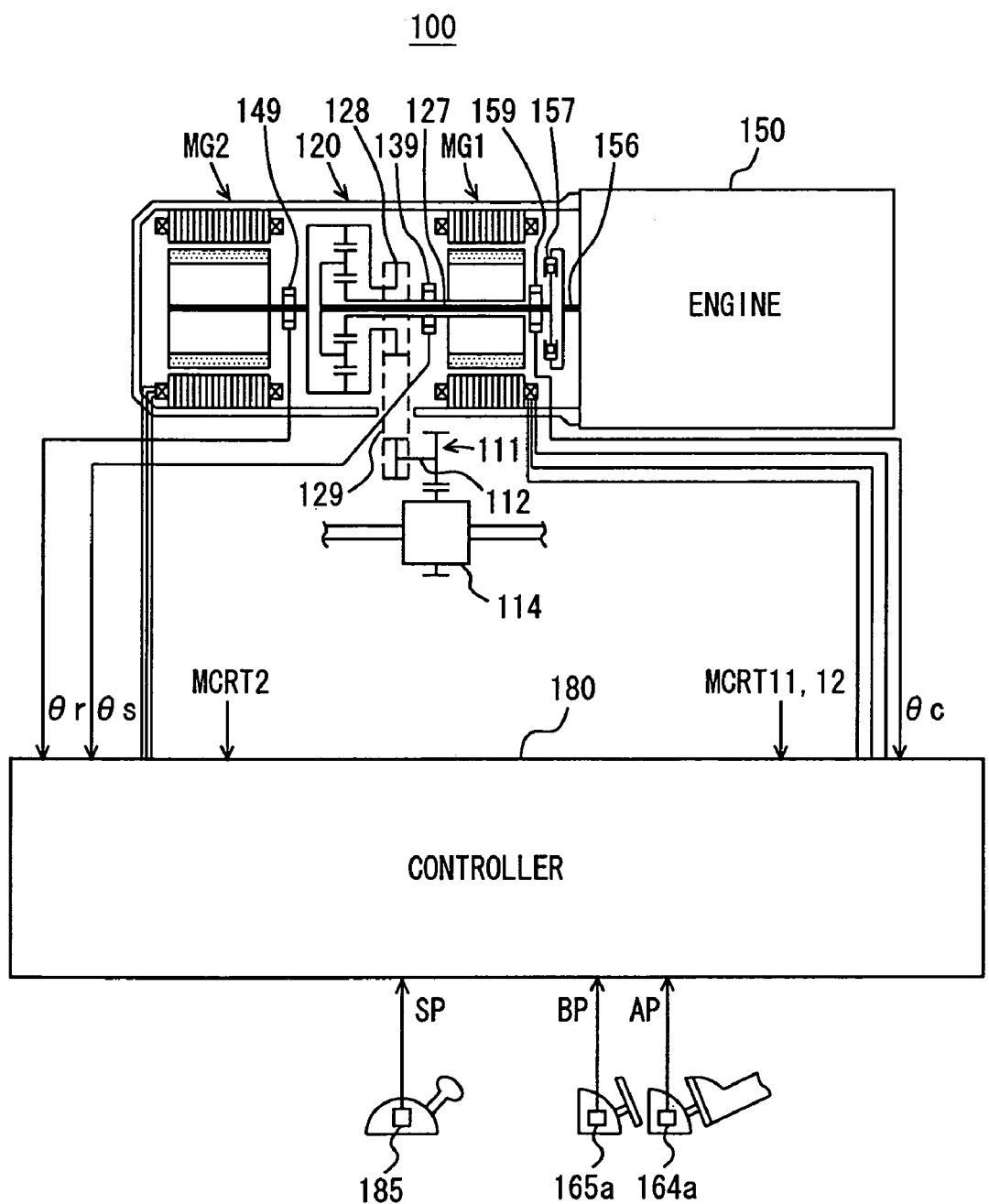
FIG. 1 is a schematic block diagram of a power output apparatus according to an embodiment of the present invention.

An embodiment of the present invention is now described in detail in connection with the drawings. It is noted that like components in the drawings are denoted by like reference characters and description thereof is not repeated here.

FIG. 1 is a schematic block diagram of a power output apparatus according to an embodiment of the present invention. Referring to FIG. 1, power output apparatus 100 in this embodiment includes a power transmission gear 111, a drive shaft 112, a differential gear 114, motor generators MG1 and MG2, a planetary gear 120, a power-feed gear 128, a chain belt 129, an engine 150, resolvers 139, 149 and 159, a damper 157 and a controller 180.

Engine 150 has a crankshaft 156 connected via damper 157 to planetary gear 120 and motor generators MG1 and MG2. Damper 157 diminishes the amplitude of torsional vibrations of crankshaft 156 of engine 150 and connects crankshaft 156 to planetary gear 120.

Power-feed gear 128 is connected via chain belt 129 to power transmission gear 111. Receiving power from a ring gear (not shown) of planetary gear 120, power-feed gear 128 transmits the supplied power to power transmission gear 111 via chain belt 129. Power transmission gear 111 then transmits the power to drive wheels via drive shaft 112 and differential gear 114.

Figure 2:
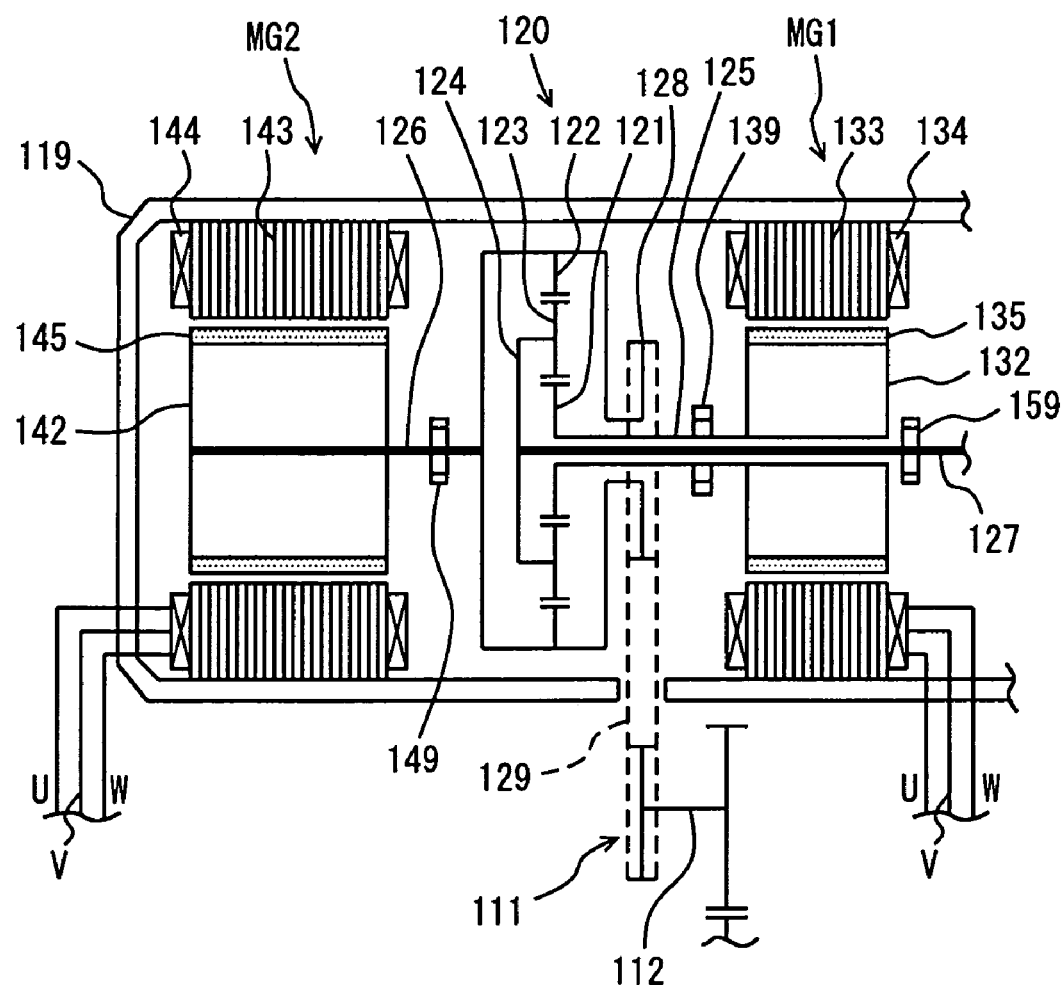
FIG. 2 is an enlarged view of a planetary gear and motors coupled thereto that are shown in FIG. 1.

Referring to FIG. 2, planetary gear 120 and motor generators MG1 and MG2 are described in detail. Planetary gear 120 includes a sun gear 121 coupled to a hollow sun gear shaft 125 having its axial center through which a carrier shaft 127 passes, a ring gear 122 coupled to a ring gear shaft 126 which is coaxial with carrier shaft 127, a plurality of planetary pinion gears 123 provided between sun gear 121 and ring gear 122 and each revolving around sun gear 121 while rotating on its axis, and a planetary carrier 124 coupled to an end of carrier shaft 127 and rotatably supporting the rotational axis of each planetary pinion gear 123.

In this planetary gear 120, three shafts, namely sun gear shaft 125, ring gear shaft 126 and carrier shaft 127 coupled respectively to sun gear 121, ring gear 122 and planetary carrier 124 serve as power input/output shafts. When power which is input/output to/from two of the three shafts is determined, power to be input/output to/from the remaining one shaft is determined based on the determined power which is input/output to/from the two shafts.

Sun gear shaft 125, ring gear shaft 126 and carrier shaft 127 have respective resolvers 139, 149 and 159 provided thereon for detecting respective rotation angles θs, θr and θc.

To ring gear 122, power-feed gear 128 for taking out power is coupled. Power-feed gear 128 is connected by chain belt 129 to power transmission gear 111 and thus power is transmitted between power-feed gear 128 and power transmission gear 111.

Motor generator MG1 is constructed as a synchronous motor-generator and includes a rotor 132 having a plurality of permanent magnets 135 on its outer peripheral surface and a stator 133 around which a three-phase coil 134 is wound to generate a revolving magnetic field. Three-phase coil 134 includes two three-phase coils as described hereinlater.

Rotor 132 is coupled to sun gear shaft 125 which is coupled to sun gear 121 of planetary gear 120. Stator 133 is formed by stacking thin non-directional electromagnetic steel plates and is fixed to a case 119. Motor generator MG1 operates to serve as a motor which rotationally drives rotor 132 through an interaction between a magnetic field generated by permanent magnets 135 and the magnetic field generated by three-phase coil 134, or as an electric generator which generates an electromotive force on both ends of three-phase coil 134 through an interaction between the magnetic field generated by permanent magnets 135 and rotations of rotor 132.

Motor generator MG2 includes a rotor 142 having a plurality of permanent magnets 145 on its outer peripheral surface and a stator 143 around which a three-phase coil 144 is wound to generate a revolving magnetic field. Rotor 142 is coupled to ring gear shaft 126 which is coupled to ring gear 122 of planetary gear 120, and stator 143 is fixed to case 119. Stator 143 is also formed by stacking thin non-directional electromagnetic steel plates. This motor generator MG2 operates, like motor generator MG1, to serve as a motor or electric generator.

Referring again to FIG. 1, controller 180 receives rotation angle θs of sun gear shaft 125 from resolver 139, rotation angle θr of ring gear shaft 126 from resolver 149, rotation angle θc of carrier shaft 127 from resolver 159, an accelerator pedal position (step-on amount of the accelerator pedal) AP from an accelerator pedal position sensor 164a, a brake pedal position (step-on amount of the brake pedal) BP from a brake pedal position sensor 165a, a shift position SP from a shift position sensor 185, motor currents MCRT11 and MCRT12 from two current sensors (not shown) attached to motor generator MG1 and a motor current MCRT2 from a current sensor (not shown) attached to motor generator MG2.

According to each of the supplied signals, controller 180 controls current to be flown through three-phase coils 134 and 144 of motor generators MG1 and MG2 and thereby drives motor generators MG1 and MG2.

Figure 3:
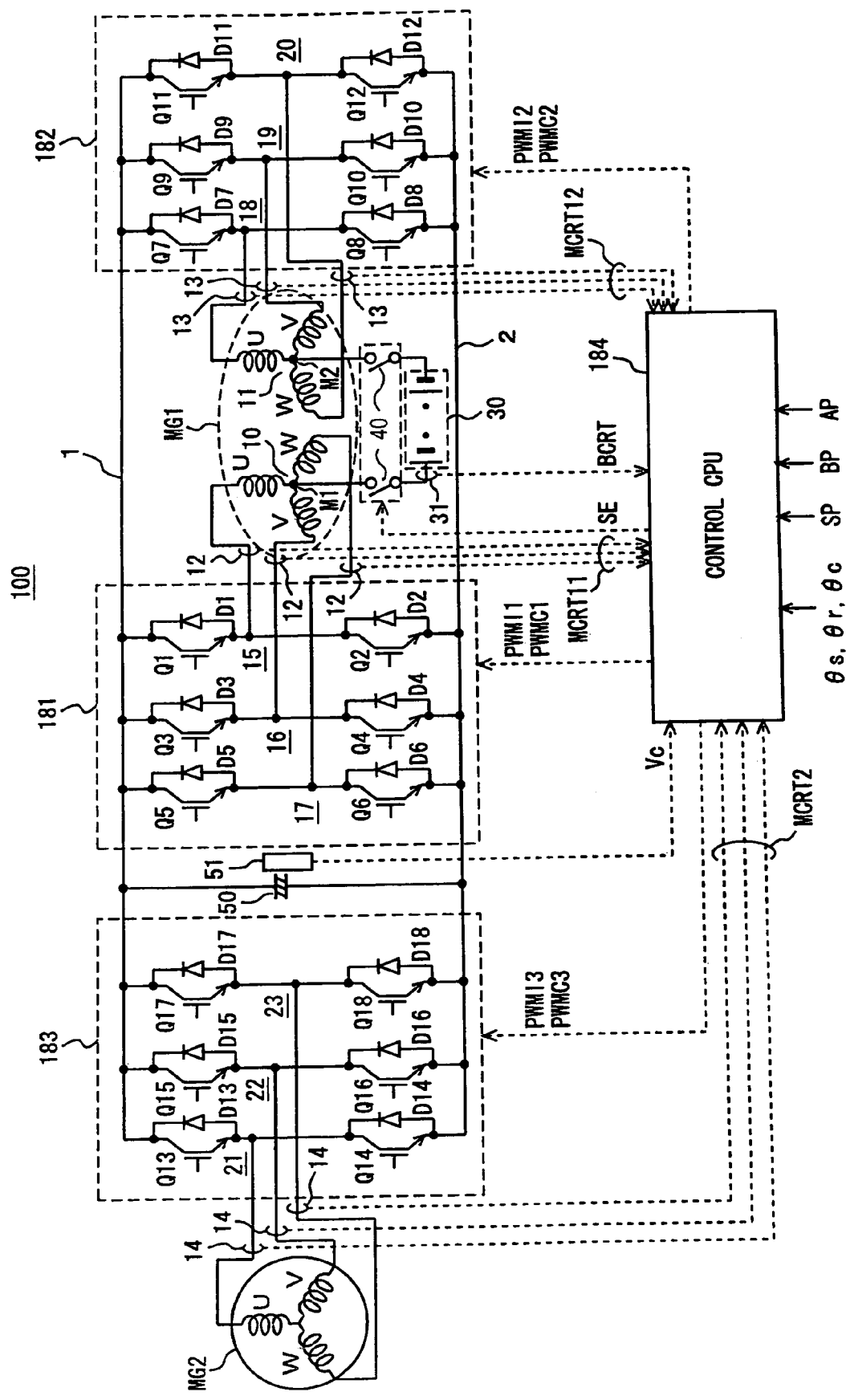
FIG. 3 is an electrical circuit diagram of a main portion of the power output apparatus shown in FIG. 1.

FIG. 3 is an electrical circuit diagram of a main portion of power output apparatus 100. Referring to FIG. 3, power output apparatus 100 includes motor generators MG1 and MG2, current sensors 12–14 and 31, a DC power supply 30, a relay 40, a capacitor 50, a voltage sensor 51, inverters 181–183, and a control CPU (Central Processing Unit) 184.

Inverters 181–183 and control CPU 184 constitute controller 180 shown in FIG. 1.

Motor generator MG1 includes two three-phase coils 10 and 11. Two three-phase coils 10 and 11 constitute three-phase coil 134 shown in FIG. 2. Namely, motor generator MG1 is a double-winding motor having Y-connected two three-phase coils 10 and 11 (called "2Y motor" in some cases).

DC power supply 30 is connected, via relay 40, between neutral point M1 of three-phase coil 10 and neutral point M2 of three-phase coil 11.

Inverter 181 includes a U-phase arm 15, a V-phase arm 16 and a W-phase arm 17. U-phase arm 15, V-phase arm 16 and W-phase arm 17 are provided in parallel between a power-supply line 1 and a ground line 2.

U-phase arm 15 is constituted of NPN transistors Q1 and Q2 connected in series between power-supply line 1 and ground line 2. V-phase arm 16 is constituted of NPN transistors Q3 and Q4 connected in series between power-supply line 1 and ground line 2. W-phase arm 17 is constituted of NPN transistors Q5 and Q6 connected in series between power-supply line 1 and ground line 2.

NPN transistors Q1, Q3 and Q5 have respective collectors connected to power-supply line 1 and respective emitters connected to respective collectors of NPN transistors Q2, Q4 and Q6. Respective emitters of NPN transistors Q2, Q4 and Q6 are connected to ground line 2. Diodes D1–D6 each flowing current from the emitter to the collector are connected respectively between respective emitters and collectors of NPN transistors Q1–Q6.

Inverter 182 includes a U-phase arm 18, a V-phase arm 19 and a W-phase arm 20. U-phase arm 18, V-phase arm 19 and W-phase arm 20 are provided in parallel between power-supply line 1 and ground line 2.

U-phase arm 18 is constituted of NPN transistors Q7 and Q8 connected in series between power-supply line 1 and ground line 2. V-phase arm 19 is constituted of NPN transistors Q9 and Q10 connected in series between power-supply line 1 and ground line 2. W-phase arm 20 is constituted of NPN transistors Q11 and Q12 connected in series between power-supply line 1 and ground line 2.

NPN transistors Q7, Q9 and Q11 have respective collectors connected to power-supply line 1 and respective emitters connected to respective collectors of NPN transistors Q8, Q10 and Q12. NPN transistors Q8, Q10 and Q12 have respective emitters connected to ground line 2. Diodes D7–D12 each flowing current from the emitter to the collector are connected respectively between respective emitters and collectors of NPN transistors Q7–Q12.

Respective intermediate points of the phase arms of inverter 181 are connected respectively to respective ends of the phase coils of three-phase coil 10, and respective intermediate points of the phase arms of inverter 182 are connected respectively to respective ends of the phase coils of three-phase coil 11. In other words, respective one-ends of the U-, V- and W-phase coils of three-phase coil 10 are commonly connected to neutral point M1, while the other end of the U-phase coil is connected to the intermediate point between NPN transistors Q1 and Q2, the other end of the V-phase coil is connected to the intermediate point between NPN transistors Q3 and Q4 and the other end of the W-phase coil is connected to the intermediate point between NPN transistors Q5 and Q6. Further, respective one-ends of the U-, V- and W-phase coils of three-phase coil 11 are commonly connected to neutral point M2, while the other end of the U-phase coil is connected to the intermediate point between NPN transistors Q7 and Q8, the other end of the V-phase coil is connected to the intermediate point between NPN transistors Q9 and Q10 and the other end of the W-phase coil is connected to the intermediate point between NPN transistors Q11 and Q12.

Inverter 183 includes a U-phase arm 21, a V-phase arm 22 and a W-phase arm 23. U-phase arm 21, V-phase arm 22 and W-phase arm 23 are provided in parallel between power-supply line 1 and ground line 2.

U-phase arm 21 is constituted of NPN transistors Q13 and Q14 connected in series between power-supply line 1 and ground line 2. V-phase arm 22 is constituted of NPN transistors Q15 and Q16 connected in series between power-supply line 1 and ground line 2. W-phase arm 23 is constituted of NPN transistors Q17 and Q18 connected in series between power-supply line 1 and ground line 2.

NPN transistors Q13, Q15 and Q17 have respective collectors connected to power-supply line 1 and respective emitters connected to respective collectors of NPN transistors Q14, Q16 and Q18. Respective emitters of NPN transistors Q14, Q16 and Q18 are connected to ground line 2. Diodes D13–D18 each flowing current from the emitter to the collector are connected respectively between respective emitters and collectors of NPN transistors Q13–Q18.

Respective intermediate points of the phase arms of inverter 183 are connected respectively to respective ends of the phase coils of motor generator MG2. In other words, motor generator MG2 is a three-phase permanent-magnet motor in which respective one-ends of the U-, V- and W-phase coils are commonly connected to the neutral point, while the other end of the U-phase coil is connected to the intermediate point between NPN transistors Q13 and Q14, the other end of the V-phase coil is connected to the intermediate point between NPN transistors Q15 and Q16 and the other end of the W-phase coil is connected to the intermediate point between NPN transistors Q17 and Q18.

Capacitor 50 is connected between power-supply line 1 and ground line 2 and in parallel with inverters 181–183.

Current sensor 12 detects motor current MCRT11 flowing through three-phase coil 10 of motor generator MG1 to output detected motor current MCRT11 to control CPU 184. Current sensor 13 detects motor current MCRT12 flowing through three-phase coil 11 of motor generator MG1 to output detected motor current MCRT12 to control CPU 184. Current sensor 14 detects motor current MCRT2 flowing through the phase coils of motor generator MG2 to output detected motor current MCRT2 to control CPU 184.

DC power supply 30 is constructed of secondary or rechargeable cell(s), for example, of nickel hydride or lithium ion. Current sensor 31 detects a DC current BCRT which is input/output to/from DC power supply to output detected DC current BCRT to control CPU 184.

Relay 40 is made ON/OFF by a signal SE from control CPU 184. Specifically, relay 40 is made ON by signal SE at an H (logical high) level from control CPU 184 and is made OFF by signal SE at an L (logical low) level from control CPU 184.

Capacitor 50 smoothes a DC voltage applied between power-supply line 1 and ground line 2 to supply the smoothed DC voltage to inverters 181–183. Voltage sensor 51 detects a terminal-to-terminal voltage Vc of capacitor 50 to output detected voltage Vc to control CPU 184.

Inverter 181 converts the DC voltage supplied from capacitor 50 into an AC voltage according to a signal PWMI1 from control CPU 184 to apply the AC voltage to the phase coils of three-phase coil 10. Inverter 182 converts the DC voltage supplied from capacitor 50 into an AC voltage according to a signal PWMI2 from control CPU 184 to apply the AC voltage to the phase coils of three-phase coil 11. Inverters 181 and 182 thus drive motor generator MG1. When DC power supply 30 is connected by relay 40 between neutral points M1 and M2, inverters 181 and 182 respectively supply the AC current superimposed on the DC current from DC power supply 30 to the phase coils of three-phase coils 10 and 11, according to signals PWMI1 and PWMI2 respectively.

Inverter 181 converts an AC voltage generated by three-phase coil 10 into a DC voltage according to a signal PWMC1 from control CPU 184 to supply the resultant DC voltage to capacitor 50. Inverter 182 converts an AC voltage generated by three-phase coil 11 into a DC voltage according to a signal PWMC2 from control CPU 184 to supply the resultant DC voltage to capacitor 50. When DC power supply 30 is connected by relay 40 between neutral points M1 and M2, inverters 181 and 182 decrease the DC voltage from capacitor 50 to charge DC power supply 30 with the decreased DC voltage according to signals PWMC1 and PWMC2 respectively.

Inverter 183 converts the DC voltage from capacitor 50 into an AC voltage according to a signal PWMI3 from control CPU 184 to drive motor generator MG2. Further, inverter 183 converts, according to a signal PWMC3 from control CPU 184, an AC voltage generated by motor generator MG2 into a DC voltage to supply the resultant DC voltage to capacitor 50.

Control CPU 184 calculates, based on accelerator pedal position AP from accelerator pedal position sensor 164a, brake pedal position BP from brake pedal position sensor 165a and shift position SP from shift position sensor 185, an engine command power, a generator command torque (motor generator MG1 command torque) TR1 and a motor command torque (motor generator MG2 command torque) TR2.

Control CPU 184 further calculates the number of revolutions of the generator (motor generator MG1) according to rotation angle θs from resolver 139, and multiplies the calculated generator command torque TR1 by the number of revolutions to calculate a generator power Pg. Control CPU 184 calculates the number of revolutions of the motor (motor generator MG2) according to rotation angle θr from resolver 149, and multiplies the calculated generator command torque TR2 by the number of revolutions to calculate a motor power Pm. Control CPU 184 then determines whether the sum of motor power Pm and generator power Pg, namely Pm+Pg, is zero or not. If the sum Pm+Pg is zero, control CPU 184 disconnects DC power supply 30 from neutral points M1 and M2 to drive motor generators MG1 and MG2. When the sum Pm+Pg is not zero, control CPU 184 drives motor generators MG1 and MG2 with DC power supply 30 connected to neutral points M1 and M2.

Control CPU 184 calculates, based on the calculated generator command torque TR1, current command values Id1* and Iq1* of motor generator MG1 as well as a capacitor voltage command value Vc* of capacitor 50. Further, control CPU 184 calculates, based on the calculated motor command torque TR2, current command values Id2* and Iq2* of motor generator MG2.

Then, control CPU 184 generates signals PWMI1, PWMI2, PWMC1 and PWMC2, according to motor currents MCRT11 and MCRT12 from current sensors 12 and 13, DC current BCRT from current sensor 31, rotation angle θs from resolver 139 mounted on sun gear shaft 125 to which the rotational shaft of motor generator MG1 is coupled, the calculated current command values Id1* and Iq1* and capacitor voltage command value Vc*, outputs the generated signals PWMI1 and PWMC1 to inverter 181 and outputs generated signals PWMI2 and PWMC2 to inverter 182.

Further, control CPU 184 generates signals PWMI3 and PWMC3 according to motor current MCRT2 from current sensor 14, rotation angle θr from resolver 149 mounted on ring gear shaft 126 to which the rotational shaft of motor generator MG2 is coupled and the calculated command values Id2* and Iq2*, and outputs the generated signals PWMI3 and PWMC3 to inverter 183.

Figure 4:
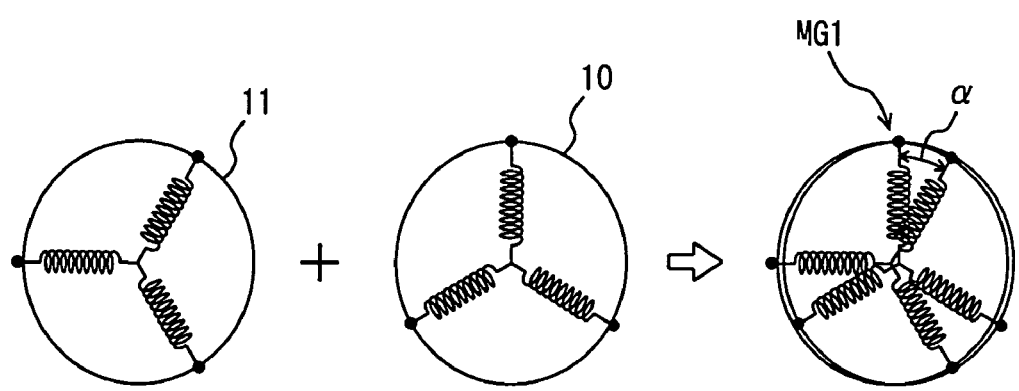
FIG. 4 is a plan view showing an arrangement of two three-phase coils shown in FIG. 3.

FIG. 4 is a plan view showing an arrangement of two three-phase coils 10 and 11 of motor generator MG1. In general, motor generator MG1 includes three-phase coil 10 and three-phase coil 11 displaced by an angle α in the rotational direction with respect to three-phase coil 10. In other words, motor generator MG1 may be regarded as a six-phase motor.

In this embodiment, angle α is supposed to be zero and descriptions will be given accordingly. In other words, two three-phase coils 10 and 11 have windings that are in same phase with each other. Then, inverters 181 and 182 may supply AC currents that are in same phase with each other to three-phase coils 10 and 11 respectively. Specifically, the AC current supplied to the U-, V- and W-phase coils of three-phase coil 10 is in same phase with the AC current supplied to the U-, V- and W-phase coils of three-phase coil 11.

Referring to FIGS. 5A–5C and FIGS. 6A–6C, a description is given below of an operational principle of motor generator MG1 and inverters 181 and 182 when DC power supply 30 is connected between neutral points M1 and M2.

Figure 5A:
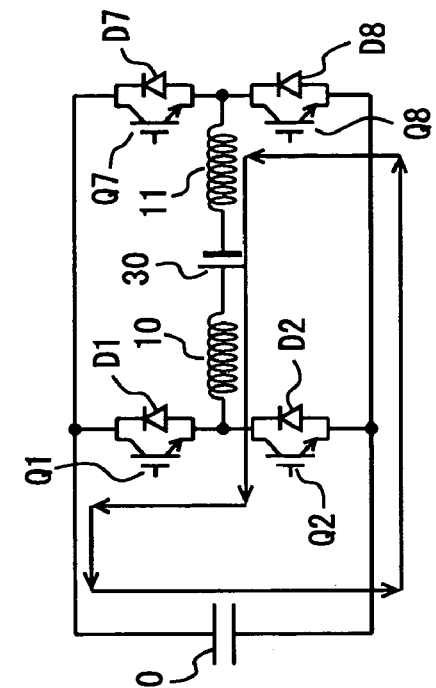
FIGS. 5A–5C are circuit diagrams each illustrating a current flow when a potential difference V012 between a neutral point M1 of a three-phase coil 10 and a neutral point M2 of a three-phase coil 11 is smaller than a voltage Vb of a DC power supply 30, in terms of leakage inductances of respective U-phase coils of three-phase coils 10 and 11 of a 2Y motor MG1.
Figure 5B:
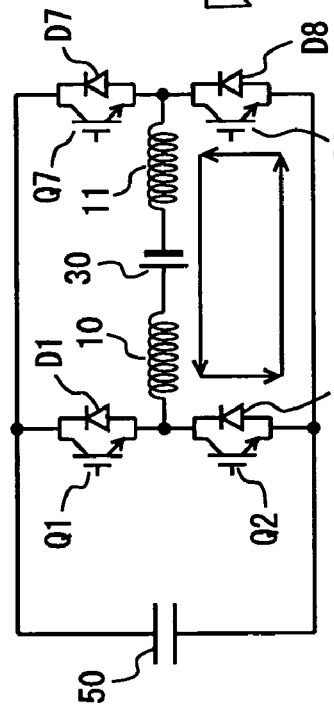
Figure 5C:
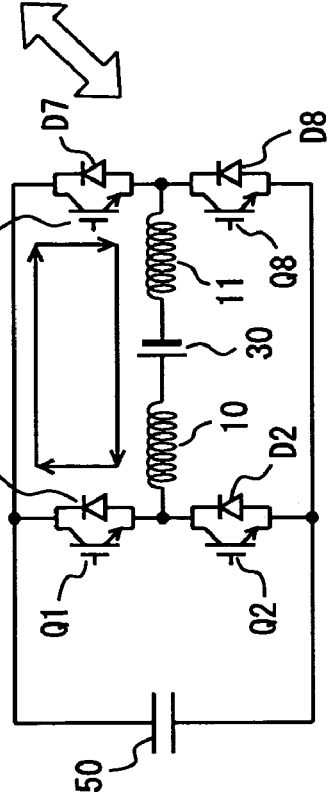

FIGS. 5A–5C each show a circuit diagram which illustrates a current flow when a potential difference V012 between neutral point M1 of three-phase coil 10 and neutral point M2 of three-phase coil 11 is smaller than a voltage Vb of DC power supply 30, in terms of leakage inductances of respective U-phase coils of three-phase coils 10 and 11 of 2Y motor MG1.

It is supposed here that, under the condition that potential difference V012 between respective neutral points M1 and M2 of three-phase coils 10 and 11 is smaller than voltage Vb of DC power supply 30, NPN transistor Q2 of inverter 181 is in an ON state or NPN transistor Q7 of inverter 182 is in an ON state.

In this case, a short circuit as indicated by the solid lines with arrows in FIG. 5A or 5B is formed so that respective U-phase coils of three-phase coils 10 and 11 of 2Y motor MG1 function as reactors. Starting from this state, NPN transistor Q2 of inverter 181 that is in the ON state is turned off or NPN transistor Q7 of inverter 182 that is in the ON state is turned off so that the energy stored in respective U-phase coils of three-phase coils 10 and 11 that function as reactors is stored in capacitor 50 by a charging circuit represented by the solid lines with arrows in FIG. 5C. Accordingly, this circuit can be regarded as a capacitor-charging circuit which increases DC voltage Vb of DC power supply 30 to charge capacitor 50 with the increased DC voltage.

Since the level to which the voltage is to be increased can freely be set according to the period in which NPN transistor Q2 or Q7 is in the ON state, terminal-to-terminal voltage Vc of capacitor 50 can be set to an arbitrary voltage which is higher than voltage Vb of DC power supply 30.

Similarly to the U-phase coils, V- and W-phase coils of three-phase coils 10 and 11 of 2Y motor MG1 can be regarded as capacitor-charging circuits. Then, voltage Vb of DC power supply 30 can be increased so as to charge capacitor 50 by setting potential difference V012 between respective neutral points M1 and M2 of three phase coils 10 and 11 to be smaller than voltage Vb of DC power supply 30 and turning on/off NPN transistors Q2, Q4 and Q6 of inverter 181 or NPN transistors Q7, Q9 and Q11 of inverter 182.

Figures 6B, 6C:
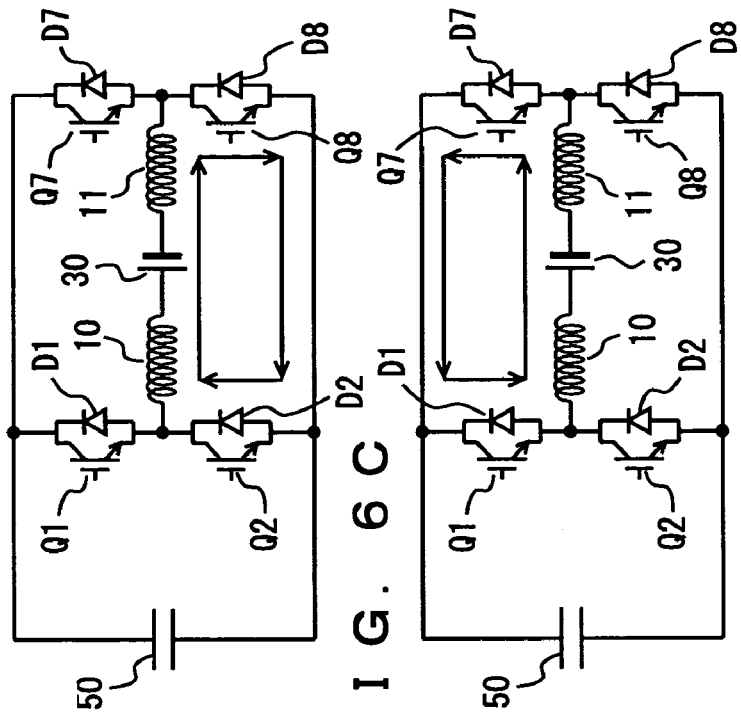
FIGS. 6A–6C are circuit diagrams each illustrating a current flow when potential difference V012 between neutral point M1 of three-phase coil 10 and neutral point M2 of three-phase coil 11 is greater than voltage Vb of DC power supply 30, in terms of leakage inductances of respective U-phase coils of three-phase coils 10 and 11 of 2Y motor MG1.
Figure 6A:
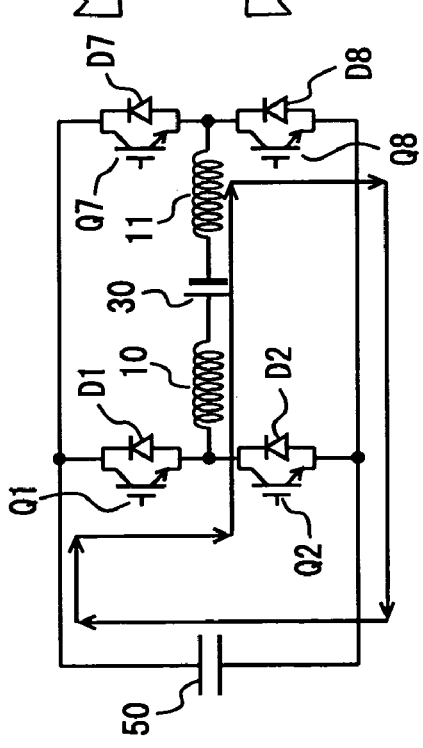

FIGS. 6A–6C each show a circuit diagram which illustrates a current flow when potential difference V012 between respective neutral points M1 and M2 of three-phase coils 10 and 11 is greater than voltage Vb of DC power supply 30, in terms of leakage inductances of respective U-phase coils of three-phase coils 10 and 11 of 2Y motor MG1.

It is supposed here that, under the condition that potential difference V012 between respective neutral points M1 and M2 of three-phase coils 10 and 11 is greater than voltage Vb of DC power supply 30, NPN transistor Q1 of inverter 181 is turned on, NPN transistor Q2 thereof is turned off, NPN transistor Q7 of inverter 182 is turned off and NPN transistor Q8 thereof is turned on. In this case, a charging circuit represented by the solid lines with arrows as shown in FIG. 6A is formed so that DC power supply 30 is charged with terminal-to-terminal voltage Vc of capacitor 50. At this time, respective U-phase coils of three-phase coils 10 and 11 of 2Y motor MG1 function as reactors as described above. Starting from this state, NPN transistor Q1 of inverter 181 or NPN transistor Q8 of inverter 182 is turned off so that the energy stored in respective U-phase coils of three-phase coils 10 and 11 that function as reactors is used to charge DC power supply 30 by a charging circuit represented by the solid lines with arrows as shown in FIG. 6B or 6C.

Accordingly, this circuit can be regarded as a DC power supply charging circuit that stores, in DC power supply 30, the energy stored in capacitor 50. Similarly to the U-phase coils, V-phase coils and W-phase coils of three-phase coils 10 and 11 of 2Y motor MG1 can be regarded as DC power supply charging circuits. Then, DC power supply 30 can be charged with the energy stored in capacitor 50 by setting potential difference V012 between respective neutral points M1 and M2 of three-phase coils 10 and 11 to be greater than voltage Vb of DC power supply 30 and turning on/off NPN transistors Q1–Q6 of inverter 181 or NPN transistors Q7–Q12 of inverter 182.

As discussed above, in power output apparatus 100, capacitor 50 can be charged by DC power supply 30 or DC power supply 30 can be charged by capacitor 50. Thus, terminal-to-terminal voltage Vc of capacitor 50 can be set to a predetermined value.

When a potential difference is generated between the terminals of capacitor 50, capacitor 50 functions as a DC power supply connected between power-supply line 1 and ground line 2 to which inverters 181 and 182 are connected, so that terminal-to-terminal voltage Vc of capacitor 50 is now an inverter input voltage Vi. Then, through switching control of NPN transistors Q1–Q6 and Q7–Q12 of inverters 181 and 182, drive control of 2Y motor MG1 can be done.

In this case, potentials Vu1, Vv1 and Vw1 of respective phases of three-phase AC current to be applied to three-phase coil 10 can be set freely within a range of inverter input voltage Vi by switching control of NPN transistors Q1–Q6 of inverter 181, and potentials Vu2, Vv2 and Vw2 of respective phases of three-phase AC current to be applied to three-phase coil 11 can be set freely within the range of inverter input voltage Vi by switching control of NPN transistors Q7–Q12 of inverter 182. Accordingly, a potential V01 on neutral point M1 of three-phase coil 10 of 2Y motor MG1 and a potential V02 on neutral point M2 of three-phase coil 11 can freely be controlled.

Figure 7A:
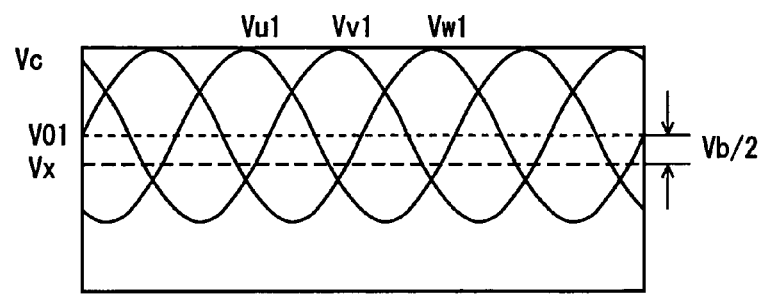
FIGS. 7A and 7B are waveform charts illustrating potentials Vu1, Vv1 and Vw1 of three-phase coil 10 and potentials Vu2, Vv2 and Vw2 of three-phase coil 11 when a difference between a potential V01 of neutral point M1 of three-phase coil 10 and a potential V02 of neutral point M2 of three-phase coil 11 is adjusted to be equal to voltage Vb of DC power supply 30.
Figure 7B:
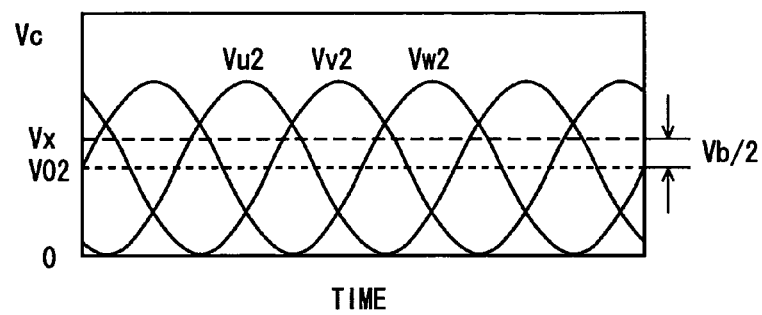

FIGS. 7A and 7B respectively show waveform charts for potentials Vu1, Vv1 and Vw1 of three-phase coil 10 (FIG. 7A) and potentials Vu2, Vv2 and Vw2 of three-phase coil 11 (FIG. 7B) when a difference between potential V01 on neutral point M1 of three-phase coil 10 and potential V02 on neutral point M2 of three-phase coil 11 is adjusted to be equal to voltage Vb of DC power supply 30. In FIGS. 7A and 7B, Vx represents the median (Vi/2) of inverter input voltage Vi. Then, control can be done in such a manner that potential difference V012 between respective neutral points of three-phase coils 10 and 11 of 2Y motor MG1 is lower than voltage Vb of DC power supply 30 so as to charge capacitor 50, or, on the contrary, control can be done in such a manner that potential difference V012 between respective neutral points of three-phase coils 10 and 11 is larger than voltage Vb of DC power supply 30 so as to charge DC power supply 30. Further, a charging current for capacitor 50 or a charging current for DC power supply 30 can be controlled by increasing/decreasing potential difference V012 between respective neutral points M1 and M2 of three-phase coils 10 and 11.

FIG. 8 shows a functional block diagram of control CPU 184 which generates signals PWMI1–PWMI3 and PWMC1–PWMC3. Referring to FIG. 8, control CPU 184 includes a current converting unit 1841, subtracters 1842 and 1852, PI control units 1843, 1853 and 1855, adders 1844 and 1846, a converting unit 1845, a PWM calculation unit 1847, a rotational speed calculation unit 1849, a speed-electromotive-force predictive calculation unit 1850, a battery-current predictive calculation unit 1851, and an adder/subtracter 1854.

A description is now given below of a function of control CPU 184 which generates signals PWMI1 and PWMI2 as well as signals PWMC1 and PWMC2. Current converting unit 1841 performs three-phase to two-phase conversion on motor currents MCRT11 and MCRT12 detected by current sensors 12 and 13, by using rotation angle θs detected by resolver 139. Specifically, current converting unit 1841 converts three-phase motor currents MCRT11 and MCRT12 flowing through the coils of three-phase coils 10 and 11 of 2Y motor MG1, by using rotation angle θs, into values Id and Iq of currents flowing through d- and q-axes, and outputs the resultant values to subtracter 1842.

Subtracter 1842 subtracts, from current command values Id1* and Iq1* that have been calculated by control CPU 184 as a part of command values regarding drive of 2Y motor MG1, current values Id and Iq supplied from current converting unit 1841 so as to determine deviations ΔId and ΔIq. PI control unit 1843 calculates a control amount for adjusting the motor current, by using a PI gain for deviations ΔId and ΔIq.

Rotational speed calculation unit 1849 calculates a rotational speed of 2Y motor MG1 based on rotation angle θs from resolver 139 and outputs the calculated rotational speed to speed-electromotive-force predictive calculation unit 1850 and to battery-current predictive calculation unit 1851. Speed-electromotive-force predictive calculation unit 1850 calculates a predictive value of the speed electromotive force based on the rotational speed from rotational speed calculation unit 1849.

Adder 1844 adds the control amount for adjusting the motor current that is supplied from PI control unit 1843 to the predictive value of the speed electromotive force that is supplied from speed-electromotive-force predictive calculation unit 1850 to calculate voltage control amounts Vd and Vq. Using rotation angle θs from resolver 139, converting unit 1845 performs two-phase to three-phase conversion on voltage control amounts Vd and Vq from adder 1844. Specifically, converting unit 1845 uses rotation angle θs to convert control amounts Vd and Vq for the voltages to be applied to the d-axis and the q-axis into control amounts for voltages to be applied to three phase coils (U-, V- and W-phase coils) of three-phase coils 10 and 11 of 2Y motor MG1.

Subtracter 1852 subtracts, from capacitor voltage command value Vc* which is a command value for the terminal-to-terminal voltage of capacitor 50 and has been calculated by control CPU 184, terminal-to-terminal voltage Vc of capacitor 50 that is detected by voltage sensor 51 so as to calculate a deviation ΔVc. PI control unit 1853 uses the PI gain for deviation ΔVc to calculate a control amount of the battery current for adjusting the capacitor voltage. Battery-current predictive calculation unit 1851 calculates a predictive value of the battery current based on the rotational speed calculated by rotational speed calculation unit 1849 and current command values Id1* and Iq1*, and outputs the calculated predictive value of the battery current to adder/subtracter 1854.

Adder/subtracter 1854 adds the predictive value of the battery current from battery-current predictive calculation unit 1851 to the battery current control amount from PI control unit 1853. Then, adder/subtracter 1854 receives, from current sensor 31, a DC current which is input/output to/from DC power supply 30, namely battery current BCRT, subtracts battery current BCRT from the sum which has been calculated, and then outputs the result of the subtraction to PI control unit 1855. PI control unit 1855 uses the PI gain for the output from adder/subtracter 1854 to set potential difference V012 between neutral points M1 and M2 of three-phase coils 10 and 11 for adjusting the battery curent.

Adder 1846 adds, to phase potentials Vu1, Vv1, Vw1, Vu2, Vv2 and Vw2 that are output from converting unit 1845, potential difference V012 which is output from PI control unit 1855, and then outputs the resultant sum to PWM calculation unit 1847. PWM calculation unit 1847 generates signals PWMI1, PWMI2, PWMC1 and PWMC2 based on the output from adder 1846. To phase potentials Vu1, Vv1, Vw1, Vu2, Vv2 and Vw2 obtained from converting unit 1845, potential difference V012 between neutral points M1 and M2 that is calculated by subtracter 1852, PI control unit 1853, battery-current predictive calculation unit 1851, adder/subtracter 1854 and PI control unit 1855 is added to calculate PWM signals (signals PWMI1 and PWMI2 and signals PWMC1 and PWMC2). Accordingly, the three-phase AC currents applied to three-phase coils 10 and 11 can have the waveforms with offsets from median Vx as shown in FIGS. 7A and 7B, so that a current can be flown to DC power supply 30 to maintain voltage Vc of capacitor 50 that functions as inverter input voltage Vi at command value Vc*.

A description is given below of a function of control CPU 184 which generates signals PWMI3 and PWMC3. Signals PWMI3 and PWMC3 are generated by current converting unit 1841, subtracter 1842, PI control unit 1843, adder 1844, converting unit 1845, adder 1846, PWM calculation unit 1847, rotational speed calculation unit 1849 and speed-electromotive-force predictive calculation unit 1850 as described above. Current converting unit 1841 uses rotation angle θr from resolver 149 to perform three-phase to two-phase conversion. Converting unit 1845 uses rotation angle θr from resolver 149 to perform two-phase to three-phase conversion. Rotational speed calculation unit 1849 uses rotation angle θr from resolver 149 to calculate the rotational speed. Further, adder 1846 adds nothing to phase potentials Vu3, Vv3 and Vw3 (voltage to be applied to each phase coil of motor generator MG2) from converting unit 1845 to output the potentials as they are to PWM calculation unit 1847. In this way, PWM calculation unit 1847 generates signals PWMI3 and PWMC3.

Figure 9:
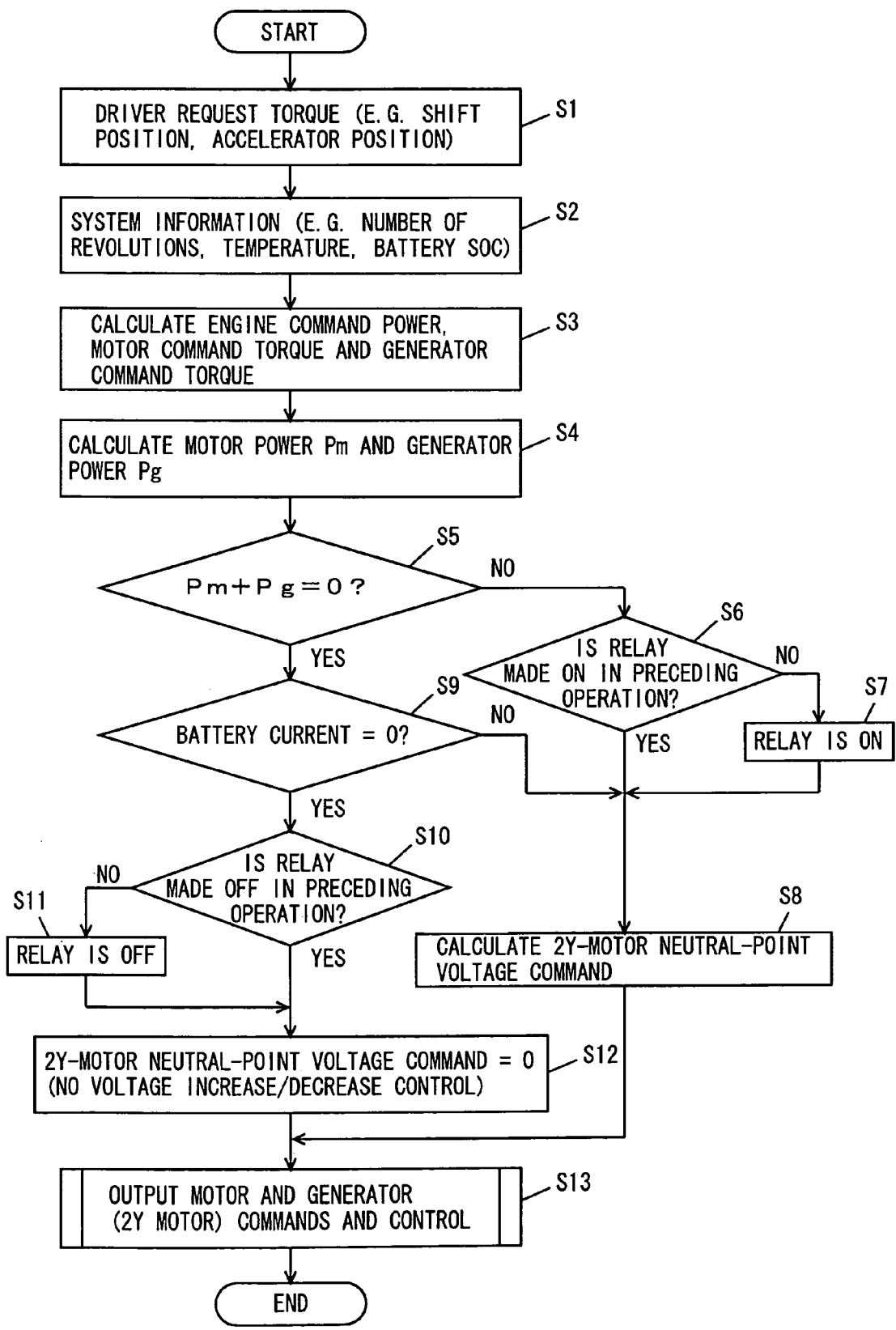
FIG. 9 is a flowchart illustrating an operation of the power output apparatus according to the present invention.
Figure 10:
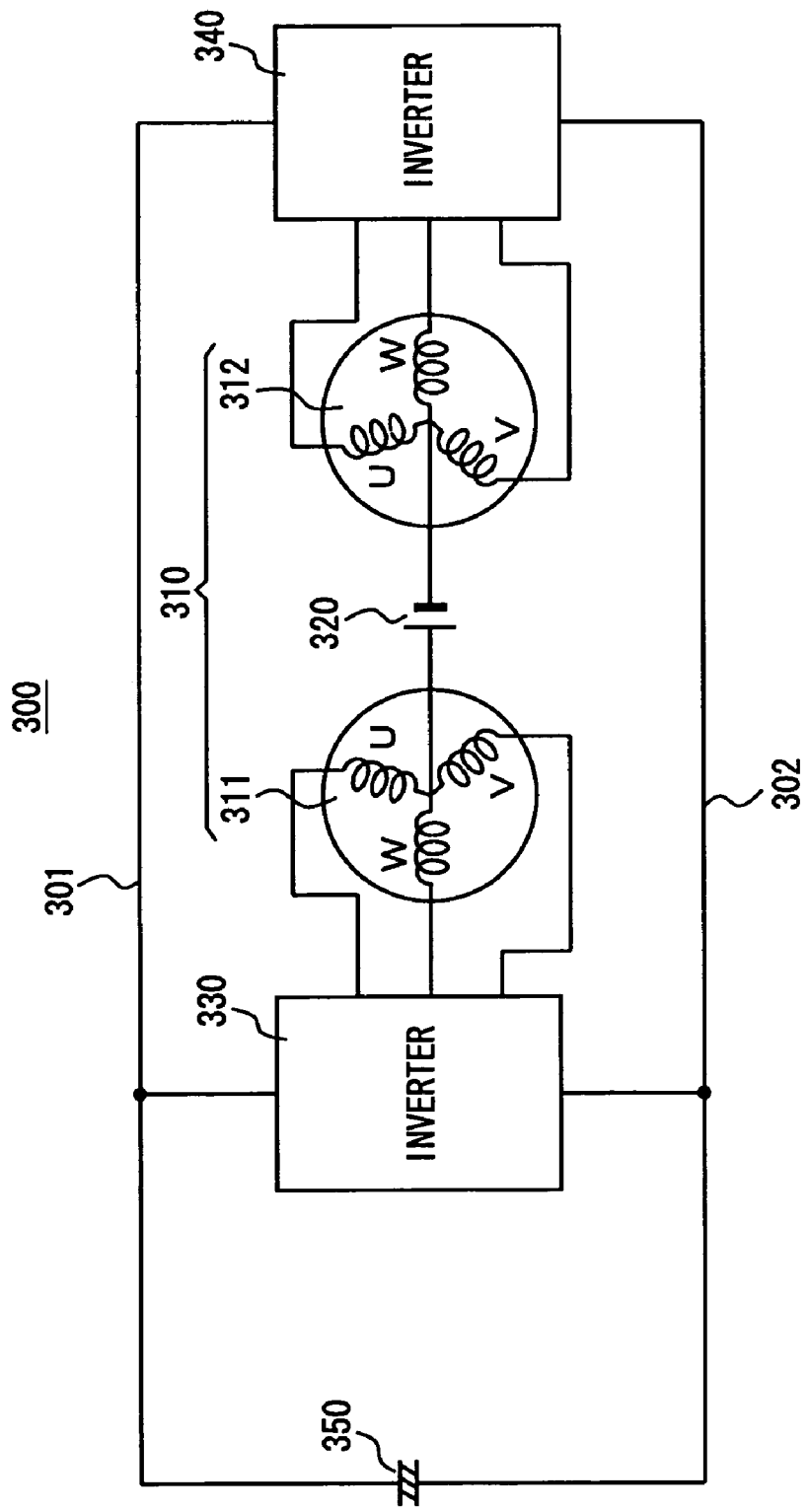
FIG. 10 is a schematic block diagram of a conventional power output apparatus.

Referring to FIG. 9, power output apparatus 100 operates as described below. Upon the start of a series of steps of this operation shown in the flowchart, control CPU 184 receives a driver request torque. Specifically, control CPU 184 receives accelerator position AP, shift position SP and brake position BP (step S1). Then, control CPU 184 receives such system information as the number of revolutions, the temperature and the capacity of DC power supply 30 (SOC (State Of Charge) of the battery) (step S2).

Control CPU 184 thereafter calculates an engine command power, generator command torque TR1 and motor command torque TR2 based on various signals received in steps S1 and S2 (step S3). Then, control CPU 184 calculates the number of revolutions MRN1 of motor generator MG1 (generator) based on rotation angle θs from resolver 139 and calculates the number of revolutions MRN2 of motor generator MG2 (motor) based on rotation angle θr from resolver 149.

Then, control CPU 184 multiplies generator command torque TR1 and motor command torque TR2 calculated in step S3 by the number of revolutions MRN1 and MRN2 respectively to calculate generator power Pg and motor power Pm (step S4). Control CPU 184 determines whether the sum of generator power Pg and motor power Pm, Pg+Pm, is zero or not (step S5) and, if the sum Pg+Pm is not zero, further determines whether relay 40 is made ON or not in the operation preceding this operation shown in the flowchart (step S6).

If it is determined in step S6 that relay 40 is not made ON in the preceding operation, control CPU 184 generates signal SE at H level and outputs the H level signal to relay 40. Then, relay 40 is made ON so that DC power supply 30 is connected to respective neutral points M1 and M2 of three-phase coils 10 and 11 (step S7). If it is determined in step S6 that relay 40 is made ON in the preceding operation or after step S7, subtracter 1852, PI control unit 1853, battery-current predictive calculation unit 1851, adder/subtracter 1854 and PI control unit 1855 calculate a potential difference between respective neutral points M1 and M2 of three-phase coils 10 and 11, namely the neutral-point voltage command of the 2Y motor, according to the above-described method (step S8). After this, this process proceeds to step S13.

If it is determined in step S5 that the sum Pg+Pm is zero, control CPU 184 further determines, based on current BCRT from current sensor 31, whether the battery current is zero or not (step S9). Then, if it is determined in step S9 that the battery current is not zero, the process proceeds to the above-described step S8.

If it is determined in step S9 that the battery current is zero, control CPU 184 determines whether relay 40 is made OFF in the preceding operation (step S10). If relay 40 is not made OFF, control CPU 184 generates signal SE at L level to output the L level signal to relay 40. Accordingly, relay 40 is made OFF and DC power supply 30 is disconnected from respective neutral points M1 and M2 of three-phase coils 10 and 11 (step S11). If it is determined in step S10 that relay 40 is made OFF in the preceding operation or after step S11, subtracter 1852, PI control unit 1853, battery-current predictive calculation unit 1851, adder/subtracter 1854 and PI control unit 1855 determine potential difference V012 between respective neutral points M1 and M2 of three-phase coils 10 and 11 as zero, namely determines the neutral-point voltage command of the 2Y motor as zero (step S12).

After step S8, with DC power supply 30 connected between neutral points M1 and M2, the generator (motor generator MG1) and the motor (motor generator MG2) are driven (step S13). After step S12, with DC power supply 30 disconnected from neutral points M1 and M2, the generator (motor generator MG1) and the motor (motor generator MG2) are driven (step S13).

The procedure through steps S5, S9–S12 and S13 is a procedure through which the generator (motor generator MG1) and the motor (motor generator MG2) are driven while DC power supply 30 is disconnected from neutral points M1 and M2, namely a procedure through which motor generator MG2 is driven by the electric power generated by motor generator MG1. In such a mode, if DC power supply 30 is connected between neutral points M1 and M2, a voltage applicable to each phase coil of three-phase coils 10 and 11 of motor generator MG1 is Vc−Vb, resulting in a decrease in power-generation efficiency of motor generator MG1.

Since motor generator MG2 is a motor which serves to drive the drive wheels of a hybrid vehicle, it is preferable, for allowing the hybrid vehicle to run smoothly, that the number of revolutions can be controlled over a wide range. Then, in order to improve the power-generation efficiency of motor generator MG1 and control the number of revolutions of motor generator MG2 over a wide range, DC power supply 30 is disconnected from neutral points M1 and M2 in the mode in which motor generator MG2 is driven by the electric power generated by motor generator MG1.

The procedure through steps S6–S8 and S13 is a procedure through which the generator (motor generator MG1) and the motor (motor generator MG2) are driven while DC power supply 30 is connected to neutral points M1 and M2. Through this procedure, potential difference V012 between neutral points M1 and M2 is increased/decreased to allow motor generator MG1 to increase voltage Vb from DC power supply 30 to charge capacitor 50, or decreases the terminal-to-terminal voltage of capacitor 50 to charge DC power supply 30. Such voltage-step-up and voltage-step-down operations are carried out by motor generator MG1 which does not output the torque to be used for driving the drive wheels of the hybrid vehicle. Thus, the efficiency of motor generator MG2 which drives the drive wheels can be made maximum.

Regarding power output apparatus 100, as described above, in the mode that the electric power generated by the generator (motor generator MG1) is used to drive the motor (motor generator MG2), DC power supply 30 is disconnected from neutral points M1 and M2 so as to improve the power-generation efficiency of the generator (motor generator MG1) and allow the motor (motor generator MG2) to operate over a wide range and, in the mode that the electric power generated by the generator (motor generator MG1) is not used to drive the motor (motor generator MG2), motor generator MG1, which does not drive the drive wheels, performs voltage step-up and step-down operations on the DC voltage. Power output apparatus 100 can thus be applied to the hybrid vehicle to allow the hybrid vehicle to run smoothly.

It is noted here that a motor driving method of the present invention is a method of driving motor generators MG1 and MG2 in accordance with the flowchart shown in FIG. 9.

Further, the drive control of the motor by control CPU 184 is actually performed by a CPU (Central Processing Unit). The CPU reads, from a ROM (Read-Only Memory), a program including the steps of the flowchart shown in FIG. 9, executes the read program and thereby performs the drive control of motor generators MG1 and MG2 in accordance with the flowchart shown in FIG. 9. Thus, the ROM corresponds to a computer (CPU)-readable recording medium having the program recorded thereon that includes the steps of the flowchart shown in FIG. 9.

Referring again to FIG. 3, operations of power output apparatus 100 which is mounted on a hybrid vehicle are described. Specifically, descriptions are given below of an operation of the power output apparatus when the engine of the hybrid vehicle is started, an operation thereof when the hybrid vehicle is started, an operation thereof when the vehicle is in a light-load running mode, an operation thereof when the vehicle is in a medium-speed and light-load running mode, an operation thereof when the vehicle is in an acceleration/rapid acceleration mode, an operation thereof when the vehicle is in a low-μ road running mode and an operation thereof when the vehicle is in a deceleration/braking mode.

Power output apparatus 100 operates as described below when the engine of the hybrid vehicle is started. Upon the start of a series of steps of the operation, control CPU 184 generates, in response to a start-up signal from an external ECU (Electrical Control Unit), a torque command value TR11 (a kind of torque command value TR1) and the number of revolutions of the motor (hereinafter referred to as "motor revolution number") MRN1 for using motor generator MG1 to start engine 150. Control CPU 184 then calculates, based on the generated torque command value TR11, current command values Id1* and Iq1* of currents to be flown through the d-axis and q-axis of motor generator MG1 and voltage command value Vc* of capacitor 50. Further, control CPU 184 receives motor currents MCRT11 and MCRT12 from current sensors 12 and 13, voltage Vc from voltage sensor 51 and rotation angle θs from resolver 139, and generates signals PWMI1 and PWMI2 in the above-described way based on the received motor currents MCRT11 and MCRT12, voltage Vc and rotation angle θs as well as the calculated current command values Id1* and Iq1* and voltage command value Vc*. Then, control CPU 184 outputs the generated signals PWMI1 and PWMI2 to inverters 181 and 182 respectively. Control CPU 184 generates signal SE at H level and outputs the signal to relay 40.

Accordingly, DC power supply 30 is connected to neutral points M1 and M2, NPN transistors Q1–Q6 of inverter 181 are turned on/off by signal PWMI1, and NPN transistors Q7–Q12 of inverter 182 are turned on/off by signal PWMI2. Then, inverters 181 and 182 increase voltage Vb which is output from DC power supply 30 to charge capacitor 50 and thereby adjust terminal-to-terminal voltage Vc of capacitor 50 to voltage command value Vc*, and convert a DC voltage from capacitor 50 into an AC voltage based on signals PWMI1 and PWMI2 to apply the resultant voltage to three-phase coils 10 and 11.

Motor generator MG1 is thus driven to output a torque designated by torque command value TR11, and the torque which is output from motor generator MG1 is transmitted to crankshaft 156 via sun gear shaft 125, planetary gear 120 and carrier shaft 127. Then, crankshaft 156 is rotated at motor revolution number MRN1 to start engine 150. Accordingly, this operation of power output apparatus 100, which is performed when the engine of the hybrid vehicle is started, is completed.

Power output apparatus 100 operates as described below when the hybrid vehicle starts running. Upon the start of a series of steps of the operation, control CPU 184 receives a run-start signal from the external ECU. In response to the run-start signal, control CPU 184 generates a torque command value TR21 (a kind of torque command value TR2) and a motor revolution number MRN2 for using motor generator MG2 to start the vehicle, and calculates current command values Id2* and Iq2* to be flown through the d-axis and q-axis of motor generator MG2 based on the generated torque command value TR21.

Control CPU 184 further generates a torque command value TR12 (a kind of torque command value TR1) and motor revolution number MRN1 for allowing motor generator MG1 to function as a generator by using the rotational force of engine 150 which has been started. Then, based on the generated torque command value TR12, control CPU 184 calculates current command values Id1* and Iq1* to be flown through the d- and q-axes of motor generator MG1 as well as voltage command value Vc* of capacitor 50.

Control CPU 184 calculates power Pm of the motor (motor generator MG2) from torque command value TR21 and motor revolution number MRN2 and calculates power Pg of the generator (motor generator MG1) from torque command value TR12 and motor revolution number MRN1. Control CPU 184 determines whether the sum of power Pm of the motor and power Pg of the generator, Pm+Pg, is zero or not. If the sum Pm+Pg is not zero, CPU 184 determines whether relay 40 is made ON or not. Since relay 40 is made ON at the start of engine 150, control CPU 184 calculates, based on the calculated current command values Id1* and Iq1* and voltage command value Vc* as well as voltage Vc from voltage sensor 51, potential difference V012 for generating electric power by three-phase coils 10 and 11 while decreasing the DC voltage of capacitor 50 to charge DC power supply 30. Control CPU 184 adds the calculated potential difference V012 to voltages Vu1, Vv1, Vw1, Vu2, Vv2 and Vw2 to be applied to respective phase coils of three-phase coils 10 and 11 that are calculated based on current command values Id1* and Iq1*, motor currents MCRT11 and MCRT12 from current sensors 12 and 13 and rotation angle θs from resolver 139 thereby generating signals PWMC1 and PWMC2, and outputs the generated signals to inverters 181 and 182 respectively.

Further, control CPU 184 receives motor current MCRT2 from current sensor 14 and rotation angle θr from resolver 149 to generate signal PWMI3 in the above-described way based on the received motor current MCRT2 and rotation angle θr as well as the calculated current command values Id2* and Iq2*, and outputs the generated signal to inverter 183.

Accordingly, inverters 181 and 182 convert an AC voltage generated by three-phase coils 10 and 11 according to signals PWMC1 and PWMC2 into a DC voltage so as to charge capacitor 50 while decreasing a DC voltage from capacitor 50 so as to charge DC power supply 30. Inverter 183 converts a DC voltage from capacitor 50 into an AC voltage according to signal PWMI3 to drive motor generator MG2. Then, motor generator MG2 generates a torque designated by torque command value TR21, transmits the generated torque to power transmission gear 111 via ring gear shaft 126, planetary gear 120, power-feed gear 128 and chain belt 129 and thereby drives the drive wheels. The hybrid vehicle thus starts running.

In this case, although motor generator MG1 performs the voltage-step-down operation, the starting performance of the hybrid vehicle never deteriorates since motor generator MG1 does not drive the drive wheels.

If the sum of power Pm of the motor and power Pg of the generator, Pm+Pg, is zero, control CPU 184 further determines whether current BCRT from current sensor 31 is zero or not. If current BCRT is not zero, the above-described procedure which is taken when the sum Pm+Pg is not zero is followed. If current BCRT from current sensor 31 is zero, control CPU 184 determines whether relay 40 is made OFF or not. In this case, since relay 40 has remained ON since the start of the engine 150, control CPU 184 generates signal SE at L level and outputs the generated L level signal to relay 40. Accordingly, relay 40 is made OFF and DC power supply 30 is disconnected from neutral points M1 and M2.

Control CPU 184 then sets potential difference V012 between neutral points M1 and M2 to zero and, based on the calculated current command values Id1* and Iq1*, motor currents MCRT11 and MCRT12 from current sensors 12 and 13 and rotation angle θs from resolver 139, generates signals PWMC1 and PWMC2 to output the generated signals to inverters 181 and 182 respectively.

Further, control CPU 184 receives motor current MCRT2 from current sensor 14 and rotation angle θr from resolver 149 and, based on the received motor current MCRT2 and rotation angle θr as well as the calculated current command values Id2* and Iq2*, generates signal PWMI3 in the above-described way to output the generated signal to inverter 183.

Accordingly, inverters 181 and 182 convert an AC voltage generated by three-phase coils 10 and 11 according to signals PWMC1 and PWMC2 into a DC voltage so as to charge capacitor 50. Inverter 183 converts a DC voltage from capacitor 50 into an AC voltage according to signal PWMI3 so as to drive motor generator MG2. Motor generator MG2 generates a torque designated by torque command value TR21, transmits the generated torque via ring gear shaft 126, planetary gear 120, power-feed gear 128 and chain belt 129 to power transmission gear 111 and thereby drives the drive wheels so that the hybrid vehicle starts running.

In this case, since DC power supply 30 is disconnected from neutral points M1 and M2, the power-generation efficiency of motor generator MG1 is enhanced. Receiving the power generated by motor generator MG1 with its power-generation efficiency enhanced, motor generator MG2 operates over a wide range. Accordingly, the hybrid vehicle starts running smoothly.

Then, the operation of the power output apparatus 100 when the hybrid vehicle starts running is completed.

Power output apparatus 100 operates as described below when the hybrid vehicle is in the light-load running mode. Upon the start of a series of steps of the operation, control CPU 184 receives a signal indicative of the light-load running mode from the external ECU. In response to the signal indicative of the light-load running mode, control CPU 184 generates a torque command value TR22 (a kind of torque command value TR2) and motor revolution number MRN2 for driving the front wheels of the hybrid vehicle by motor generator MG2 only. Control CPU 184 then calculates current command values Id2* and Iq2* to be flown through the d- and q-axes of motor generator MG2 based on the generated torque command value TR22. Control CPU 184 receives motor current MCRT2 from current sensor 14 and rotation angle θr from resolver 149. Based on the received motor current MCRT2 and rotation angle θr as well as the calculated current command values Id2* and Iq2*, control CPU 184 generates signal PWMI3 in the above-described way and outputs the signal to inverter 183.

According to signal PWMI3, inverter 183 converts a DC voltage from capacitor 50 into an AC voltage to drive motor generator MG2. Motor generator MG2 generates a torque designated by torque command value TR22, transmits the generated torque to power transmission gear 111 via ring gear shaft 126, planetary gear 120, power-feed gear 128 and chain belt 129, and thereby drives the drive wheels so that the hybrid vehicle runs under light load. Accordingly, the operation of power output apparatus 100 when the hybrid vehicle is in the light-load running mode is completed.

Power output apparatus 100 operates as described below when the hybrid vehicle is in the medium-speed and light-load mode. The operation of power output apparatus 100 in this mode is identical to the operation which is carried out when engine 150 of the hybrid vehicle is started as described above.

Power output apparatus 100 operates as described below when the hybrid vehicle is in the acceleration/rapid acceleration mode. Upon the start of a series of steps of the operation, control CPU 184 receives from the external ECU a signal indicative of the acceleration/rapid acceleration mode. In response to the signal indicative of the acceleration/rapid acceleration mode, control CPU 184 generates a torque command value TR23 (a kind of torque command value TR2) and motor revolution number MRN2 for using motor generator MG2 for acceleration/rapid acceleration. Then, based on the generated torque command value TR23, control CPU 184 calculates current command values Id2* and Iq2* to be flown through the d- and q-axes of motor generator MG2.

Further, control CPU 184 generates a torque command value TR13 (a kind of torque command value TR1) and motor revolution number MRN1 for allowing motor generator MG1 to function as a generator which generates electric power from the rotational force of engine 150. Based on the generated torque command value TR13, control CPU 184 calculates current command values Id1* and Iq1* to be flown through the d- and q-axes of motor generator MG1 and voltage command value Vc* of capacitor 50.

Control CPU 184 further calculates power Pm of the motor (motor generator MG2) from torque command value TR23 and motor revolution number MRN2 as well as power Pg of the generator (motor generator MG1) from torque command value TR13 and motor revolution number MRN1. Then, control CPU 184 determines whether the sum of power Pm of the motor and power Pg of the generator, Pm+Pg, is zero or not. If the sum Pm+Pg is not zero, control CPU 184 determines whether relay 40 is made ON or not. If relay 40 is not made ON, control CPU 184 generates signal SE at H level and outputs the generated signal to relay 40. Accordingly, DC power supply 30 is connected to neutral points M1 and M2.

After this, based on the calculated current command values Id1* and Iq1* and voltage command value Vc* as well as voltage Vc supplied from voltage sensor 51, control CPU 184 calculates potential difference V012 for generating electric power by three-phase coils 10 and 11 while decreasing a DC voltage of capacitor 50 to charge DC power supply 30. Then, control CPU 184 adds the calculated potential difference V012 to voltages Vu1, Vv1, Vw1, Vu2, Vv2 and Vw2 to be applied to respective phase coils of three-phase coils 10 and 11 that are calculated based on current command values Id1* and Iq1*, motor currents MCRT11 and MCRT12 from current sensors 12 and 13 and rotation angle θs from resolver 139, thereby generates signals PWMC1 and PWMC2 and outputs the signals to inverters 181 and 182 respectively.

Further, control CPU 184 receives motor current MCRT2 from current sensor 14 and rotation angle θr from resolver 149, generates signal PWMI3 in the above-described way based on the received motor current MCRT2 and rotation angle θr and the calculated current command values Id2* and Iq2*, and outputs the generated signal to inverter 183.

Inverters 181 and 182 thus convert an AC voltage generated by three-phase coils 10 and 11 according to signals PWMC1 and PWMC2 into a DC voltage so as to charge capacitor 50 and decreases a DC voltage from capacitor 50 so as to charge DC power supply 30. Inverter 183 converts a DC voltage from capacitor 50 into an AC voltage according to signal PWMI3 so as to drive motor generator MG2. Motor generator MG2 generates a torque designated by torque command value TR23 and transmits the generated torque via ring gear shaft 126, planetary gear 120, power-feed gear 128 and chain belt 129 to power transmission gear 111 so as to drive the drive wheels so that the hybrid vehicle accelerates/rapidly accelerates.

In this case, although motor generator MG1 performs the voltage-step-down operation, the starting performance of the hybrid vehicle never deteriorates since motor generator MG1 does not drive the drive wheels.

If the sum of power Pm of the motor and power Pg of the generator, Pm+Pg, is zero, control CPU 184 further determines whether current BCRT from current sensor 31 is zero or not. If current BCRT is not zero, the above-described procedure when the sum Pm+Pg is not zero is followed. If current BCRT from current sensor 31 is zero, control CPU 184 determines whether relay 40 is made OFF or not. If relay 40 is not made OFF, control CPU 184 generates signal SE at L level to output the L level signal to relay 40. Relay 40 is thus made OFF so that DC power supply 30 is disconnected from neutral points M1 and M2.

After this, control CPU 184 sets potential difference V012 between neutral points M1 and M2 to zero and, based on the calculated current command values Id1* and Iq1*, motor currents MCRT11 and MCRT12 from current sensors 12 and 13 and rotation angle θs from resolver 139, generates signals PWMC1 and PWMC2 to output the signals to inverters 181 and 182 respectively.

Control CPU 184 receives motor current MCRT2 from current sensor 14 and rotation angle θr from resolver 149 and, based on the received motor current MCRT2 and rotation angle θr and the calculated current command values Id2* and Iq2*, generates signal PWMI3 in the above-described way and outputs the generated signal to inverter 183.

Then, inverters 181 and 182 convert an AC voltage generated by three-phase coils 10 and 11 according to signals PWMC1 and PWMC2 into a DC voltage so as to charge capacitor 50. Inverter 183 converts a DC voltage from capacitor 50 into an AC voltage according to signal PWMI3 to drive motor generator MG2. Motor generator MG2 generates a torque designated by torque command value TR23 and transmits the generated torque via ring gear shaft 126, planetary gear 120, power-feed gear 128 and chain belt 129 to power transmission gear 111 so as to drive the drive wheels so that the hybrid vehicle accelerates/rapidly accelerates.

In this case, since DC power supply 30 is disconnected from neutral points M1 and M2, the power-generation efficiency of motor generator MG1 is enhanced. Receiving the power generated by motor generator MG1 with its power-generation efficiency enhanced, motor generator MG2 operates over a wide range. Accordingly, the hybrid vehicle accelerates/rapidly accelerates smoothly. The operation of power output apparatus 100 in the acceleration/rapid acceleration mode of the hybrid vehicle is thus completed.

Power output apparatus 100 operates as described below when the hybrid vehicle is in the low-μ road running mode. Upon the start of a series of steps of the operation, control CPU 184 receives a signal indicative of the low-μ road running mode from the external ECU. In response to the signal indicative of the low-μ road running mode, control CPU 184 generates a torque command value TR24 and motor revolution number MRN2 for driving motor generator MG2 in a regenerative mode and, based on the generated torque command value TR24, calculates current command values Id2* and Iq2* to be flown through the d- and q-axes of motor generator MG2.

Control CPU 184 then generates signal PWMC3 based on motor current MCRT2 from current sensor 14, rotation angle θr from resolver 149 and the calculated curent command values Id2* and Iq2*, and outputs the generated signal to inverter 183.

According to signal PWMC3, inverter 183 converts an AC voltage generated by motor generator MG2 into a DC voltage so as to charge capacitor 50. The operation of power output apparatus 100 when the hybrid vehicle is in the low-μ road running mode is accordingly completed.

Power output apparatus 100 operates as described below when the hybrid vehicle is in the deceleration/braking mode. In this case, since the power is recovered, in the form of electric energy, from the energy generated when the vehicle is running, motor generator MG2 is driven in the regenerative mode. Therefore, the operation of power output apparatus 100 in this case is identical to that in the low-μ road running mode.

According to this embodiment, the power output apparatus includes motor generator MG1, motor generator MG2, the DC power supply, the relay connecting/disconnecting the DC power supply between/from respective neutral points of two three-phase coils of motor generator MG1, and the control CPU which controls the relay in such a manner that, when motor generator MG2 is to be driven by electric power generated by motor generator MG1, the DC power supply is disconnected from respective neutral points of the two three-phase coils of motor generator MG1. Accordingly, the power-generation efficiency of motor generator MG1 can be improved and motor generator MG2 can operate over a wide range. Moreover, since the control CPU drives motor generator MG1 in such a manner that motor generator MG1 performs the voltage-step-up or voltage-step-down operation, motor generator MG2 which drives the drive wheels of the hybrid vehicle can exhibit the maximum efficiency.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power output apparatus, comprising:
a first inverter;
a second inverter;

a 2Y motor connected with an internal combustion engine and having a first three-phase motor coil and a second three-phase motor coil functioning as stators, energization of said first and second three-phase motor coils being controlled respectively by said first and second inverters;

a power supply connected between a first neutral point of said first three-phase motor coil and a second neutral point of said second three-phase motor coil; and an electric motor connected with said 2Y motor for at least one of supplying and receiving electric power therebetween for generating drive force of a vehicle, wherein said 2Y motor generates electric power from a rotational force from an internal combustion engine and starts said internal combustion engine.

2. The power output apparatus according to claim 1, further comprising a planetary gear to which said 2Y motor, said electric motor and said internal combustion engine are connected.

3. The power output apparatus according to claim 1, further comprising:
   a third inverter driving said electric motor; and
   a control unit controlling said first, second and third inverters, wherein
   when said control unit controls said first and second inverters to allow said 2Y motor to function as an electric generator, said control unit controls said third inverter to allow said third inverter to drive said electric motor by electric power generated by said 2Y motor.

4. The power output apparatus according to claim 3, wherein
   said control unit disconnects said power supply from said first and second neutral points.

5. The power output apparatus according to claim 4, further comprising a relay unit provided between said first and second neutral points and said power supply, wherein
   said relay unit is controlled by said control unit to connect/disconnect said power supply to/from said first and second neutral points.

6. A motor driving method for driving a 2Y motor coupled to an internal combustion engine of a hybrid vehicle and an electric motor coupled to drive wheels of said hybrid vehicle, comprising:
   a first step of calculating a first power of said 2Y motor and a second power of said electric motor;
   a second step of determining whether the sum of said calculated first power and said calculated second power is zero or not; and
   a third step of disconnecting, when said sum is equal to zero, a power supply from respective neutral points of two three-phase coils included in said 2Y motor.

7. The motor driving method according to claim 6, further comprising:
   a fourth step of driving said 2Y motor as an electric generator; and
   a fifth step of driving said electric motor by electric power generated by said 2Y motor.

8. The motor driving method according to claim 6, further comprising:
   a sixth step of driving, when said sum is unequal to zero, said 2Y motor as an electric motor while increasing a voltage from said power supply to charge a capacitor provided on an input side of an inverter which drives said 2Y motor; and
   a seventh step of driving, when said sum is unequal to zero, said 2Y motor as an electric generator while decreasing a DC voltage from said capacitor to charge said power supply.

9. A computer-readable recording medium having a program recorded thereon for allowing a computer to execute drive control of a 2Y motor coupled to an internal combustion engine of a hybrid vehicle and an electric motor coupled to drive wheels of said hybrid vehicle, said computer following said program to execute:
   a first step of calculating a first power of said 2Y motor and a second power of said electric motor;
   a second step of determining whether the sum of said calculated first power and said calculated second power is zero or not; and
   a third step of disconnecting, when said sum is equal to zero, a power supply from respective neutral points of two three-phase coils included in said 2Y motor.

10. The computer-readable recording medium according to claim 9, said computer following said program to further execute:
    a fourth step of driving said 2Y motor as an electric generator; and
    a fifth step of driving said electric motor by electric power generated by said 2Y motor.

11. The computer-readable recording medium according to claim 9, said computer following said program to further execute:
    a sixth step of driving, when said sum is unequal to zero, said 2Y motor as an electric motor while increasing a voltage from said power supply to charge a capacitor provided on an input side of inverters driving said 2Y motor; and
    a seventh step of driving, when said sum is unequal to zero, said 2Y motor as an electric generator while decreasing a DC voltage from said capacitor to charge said power supply.

12. The power output apparatus according to claim 1, wherein said power supply is a DC power supply.

* * * * *